Sept. 7, 1965　　　C. P. GUERRIERO　　　3,204,980
INDEPENDENT SUSPENSION HAVING TORSION BAR SPRINGS
Filed Nov. 27, 1963　　　2 Sheets-Sheet 1
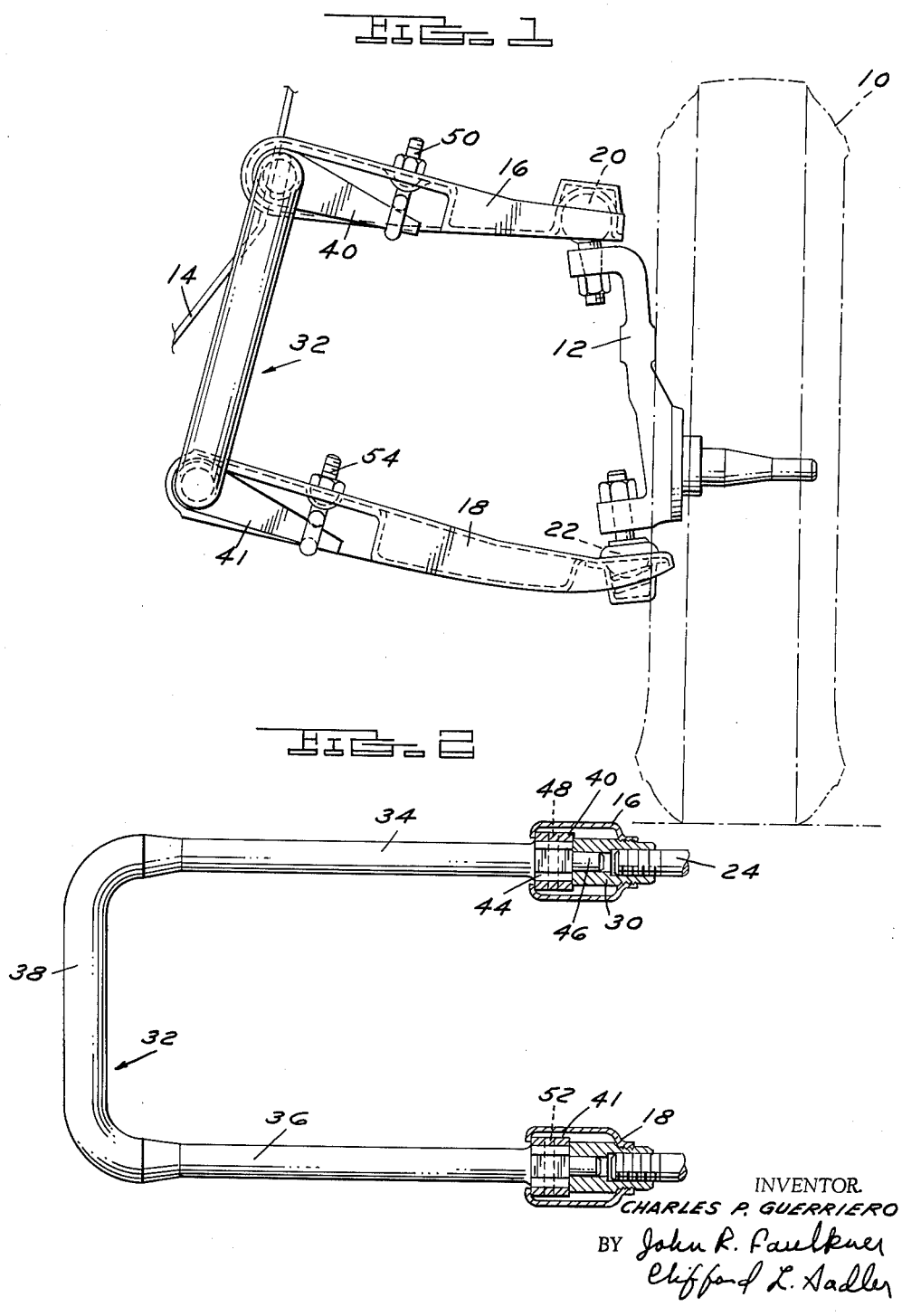
INVENTOR.
CHARLES P. GUERRIERO
BY John R. Faulkner
Clifford L. Sadler
ATTORNEYS

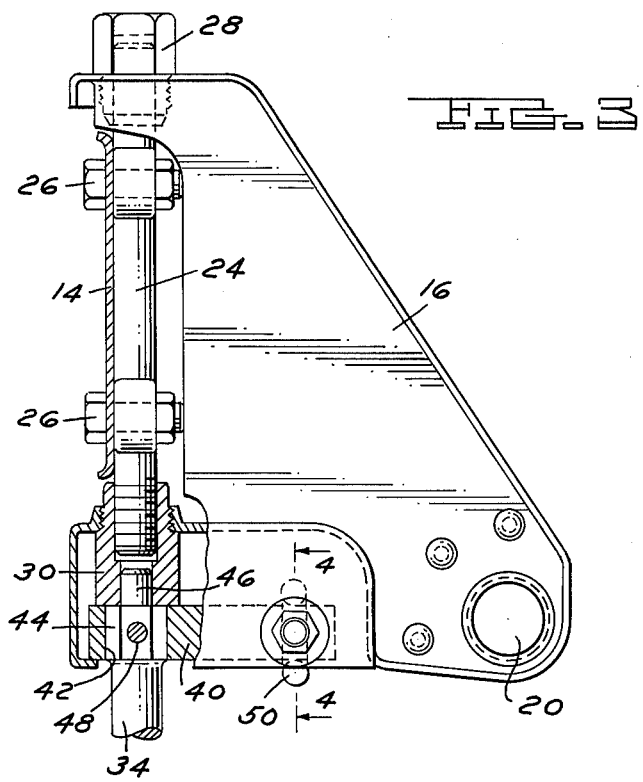

United States Patent Office 3,204,980
Patented Sept. 7, 1965

3,204,980
INDEPENDENT SUSPENSION HAVING TORSION BAR SPRINGS
Charles P. Guerriero, Dearborn, Mich., assignor to Ford Motor Company, Dearborn, Mich., a corporation of Delaware
Filed Nov. 27, 1963, Ser. No. 326,553
5 Claims. (Cl. 280—124)

The present invention relates to independent suspension systems for motor vehicles, and more particularly to such suspensions that incorporate torsion bar springs.

The present invention provides a novel arrangement for supporting the vehicle chassis upon the road wheels using a torsion bar spring having a generally U-shape.

In a conventional automotive vehicle having an independent front suspension, the wheel and wheel support member are connected to the vehicle chassis by upper and lower laterally extending suspension arms. In the preferred embodiment of this invention, a U-shaped torsion bar has torsional segments extending generally parallel to the pivot axis for the respective arms with its ends connected to the arms.

The many objects and advantages of this invention will be more fully comprehended from consideration of the following discussion and the accompanying drawings, in which:

FIGURE 1 is an elevational view of an independent front suspension system for a vehicle incorporating the present invention;

FIGURE 2 is an elevational view of the torsion spring of FIGURE 1 and its end connecting construction;

FIGURE 3 is a top plan view of one of the suspension arms and their connection with the torsion spring; and FIGURE 4 is a sectional view taken along section lines 4—4 of FIGURE 3.

Referring now to the drawings for a more comprehensive disclosure of the invention, FIGURE 1 illustrates an independent front suspension for an automotive vehicle having a wheel 10 supported on a wheel support member 12. This figure also discloses a portion of a vehicle chassis 14 to which the wheel 10 and support member 12 are connected.

Suspension means are provided for connecting the wheel support member 12 to the chassis 14 and include an upper suspension arm 16 and a lower suspension arm 18. The outer end of the upper arm 16 is connected to the upper end of the wheel support 12 by a ball and socket joint assembly 20. The ball portion of the joint is secured to the support member 12 and the socket portion is formed in the outer end of the arm 16. In a similar fashion, the outer end of the lower arm 18 is provided with a socket that receives a ball joint assembly 22. This assembly has its ball member secured to the lower end of the wheel support 12.

The inner ends of the upper and lower arms 16, 18 are pivotally connected to the vehicle chassis 14. The connections are generally similar for both arms and reference is made to FIGURE 3 for a disclosure of the details of the inner pivotal connection for the upper arm 16. A pivot shaft 24 is secured to the chassis sheet metal 14 by a pair of bolts 26. The arm 16 is provided with a pair of spaced apart bushings that receive the ends of the pivot shaft 24. These bushings include a rear threaded bushing 28 that is secured to the rear extremity of the arm 16 and threadedly engages one end of the pivot shaft 24. A forward bushing 30 is secured to the arm 16 and is internally threaded to engage the forward end of the shaft 24. The threaded connection between the bushings 28, 30 and the ends of the pivot shaft 24 permits the arm 16 to rotate in a jounce and rebound direction while also absorbing longitudinal thrust forces.

The arm 16 has the shape of a right triangle with the ball joint assembly 20 at one corner and the bushings 28 and 30 at the other corners. The lower arm 18 is of similar configuration and is secured to a pivot shaft mounted on the chassis 14 in a similar fashion.

A torsion bar spring 32 interconnects the arms 16 and 18 and provides resilient support for the chassis 14. As disclosed in FIGURE 2, the torsion bar 32 has a generally U-shape with a straight upper torsional segment 34 and a straight lower torsional segment 36. The forward ends of the torsional segments 34, 36 are interconnected by an enlarged portion 38. The rearward or terminating ends of the torsional segments 34, 36 engage separate lever arms 40 and 41.

Lever arm 40 has a hexagonal socket 42 that is engaged by a hexagonal portion 44 formed on the end of the torsional segment 34. The tip of the bar has a reduced diameter portion 46 that is piloted within a bore drilled in the bushing 30. The lever arm 40 is locked to the hexagonal end 44 by a pin 48 that passes through both the lever arm 40 and the end 44.

The lever arm 40 extends radially outwardly at a right angle to the axis of the torsional segment 34 and has its end secured to the arm 16 by an eye bolt 50. The threaded eye bolt 50 provides an adjustable connection between the end of the lever arm 40 and the suspension arm 16. It is used to impose a torsional preload upon the suspension spring 32.

The rearward end of the torsional segment 36 is connected to the lever arm 40 and suspension arm 18 with an identical construction. There is a hexagonal interconnection between the end of the segment 36 and the lever arm 40. A locking pin 52 secures the connection. An eye bolt 54 connects the outer end of the lever arm 42 to the arm 18 and provides an adjustment device.

As in a conventional suspension, the wheel 10 and its support member 12 move in a generally vertical path in response to road conditions. This movement is permitted by the articulated connection between the ends of the suspension arms 16, 18 and the chassis 14 and wheel support 12. When the arm 16 moves in jounce, lever arm 40 will be rotated about its pivot axis, and thereby impart a twist to the torsion spring 32. At the same time, the arm 18 will move in the same direction of rotation causing lever arm 42 to twist the other end of the spring 32. Thus, with the present invention the torsion spring is loaded from both ends in an efficient manner. The forces and loads are evenly distributed, thereby avoiding stress concentrations. The torsional segments of the spring are in direct alignment with the pivot axes of the suspension arms so that they carry a pure torsional load. The interconnecting portion 38 is loaded in bending and, thus has a larger diameter to counteract the stresses that are imposed upon it.

The suspension of this invention, efficiently and compactly provides a resilient support for a chassis upon the unsprung components when a pair of suspension arms are used to connect those components to the chassis.

Modifications and alterations of this invention may occur to those skilled in the art that will come within the scope and spirit of the following claims.

I claim:
1. A motor vehicle suspension system having a chassis, a wheel, a support member for said wheel, an upper suspension arm pivotally connected to said chassis at its inner end and pivotally connected to said support member at its outer end, a lower suspension arm having a pivotal connection with said chassis at its inner end and a pivotal connection with said support member at its outer end, a U-shaped torsion spring having generally parallel torsional segments, one of said segments lying on the pivot axis of said upper arm and the other of said torsional segments lying on the pivot axis of said lower arm, adjustable connecting means interposed between the end of each of said segments and its respective suspension arm and adapted to transmit a spring load from said segment to said arm.

2. A motor vehicle suspension system having a chassis, a wheel, a support member for said wheel, an upper suspension arm pivotally connected to said chassis at its inner end and pivotally connected to said support member at its outer end, a lower suspension arm having a pivotal connection with said chassis at its inner end and a pivotal connection with said support member at its outer end, a single torsion spring having a pair of torsional segments, one of said segments lying on the pivot axis of said upper arm and the other of said torsional segments lying on the pivot axis of said lower arm, means interposed between the end of each of said segments and its respective suspension arm and adapted to transmit a spring load from said segment to said respective arm.

3. A motor vehicle suspension system having a chassis, a wheel, a support member for said wheel, a pair of suspension arms pivotally connected to said chassis and to said support member and adapted to permit said wheel and said support member to move in jounce and rebound relative to said chassis, a U-shape torsion spring having one of its ends connected to one of said arms and the other of its ends connected to the other of said arms, a pivot shaft secured to said chassis, one of said arms having a pair of spaced apart bushings pivotally engaging the ends of said shaft, one of said bushings having a central bore in alignment with the pivot axis of said shaft, one end of said torsion spring having a pilot portion fitted in said bore, a lever arm extending from said torsion spring adjacent to said pilot portion, adjustable means connecting said lever arm to said one suspension arm.

4. A motor vehicle suspension system having a chassis, a wheel, a support member for said wheel, a pair of suspension arm means pivotally connected to said chassis and to said support member and constructed to permit said wheel and said support member to move in jounce and rebound relative to said chassis, a U-shape torsion spring having one of its ends connected to one of said arm means and the other of its ends connected to the other of said arm means, said one arm means having a bore in alignment with its pivot axis of said shaft, one end of said torsion spring having a pilot portion fitted in said bore, a lever arm extending from said torsion spring adjacent to said pilot portion, means connecting said lever arm to said one suspension arm means.

5. A motor vehicle suspension system having a chassis, a wheel, a support member for said wheel, a suspension arm means pivotally connected to said chassis and to said support member and constructed to permit said wheel and said support member to move in jounce and rebound relative to said chassis, a torsion spring having one of its ends connected to said arm means and constructed to resiliently support said chassis on said wheel, said arm means having a bore in alignment with its pivot axis, the end of said torsion bar having a pilot tip fitted in said bore, a lever arm extending from said torsion bar adjacent to said pilot end, means connecting said lever arm to said suspension arm means.

References Cited by the Examiner

UNITED STATES PATENTS

| 2,148,029 | 2/39 | Matthews | 267—57 |
| 2,794,632 | 6/57 | Schilberg | 280—124 X |
| 3,029,091 | 4/62 | Allison | 267—57 X |
| 3,104,117 | 9/63 | Pierce | 280—96.2 |

FOREIGN PATENTS

| 427,907 | 5/35 | Great Britain. |
| 626,484 | 2/36 | Germany. |

A. HARRY LEVY, *Primary Examiner.*